Figure 1:
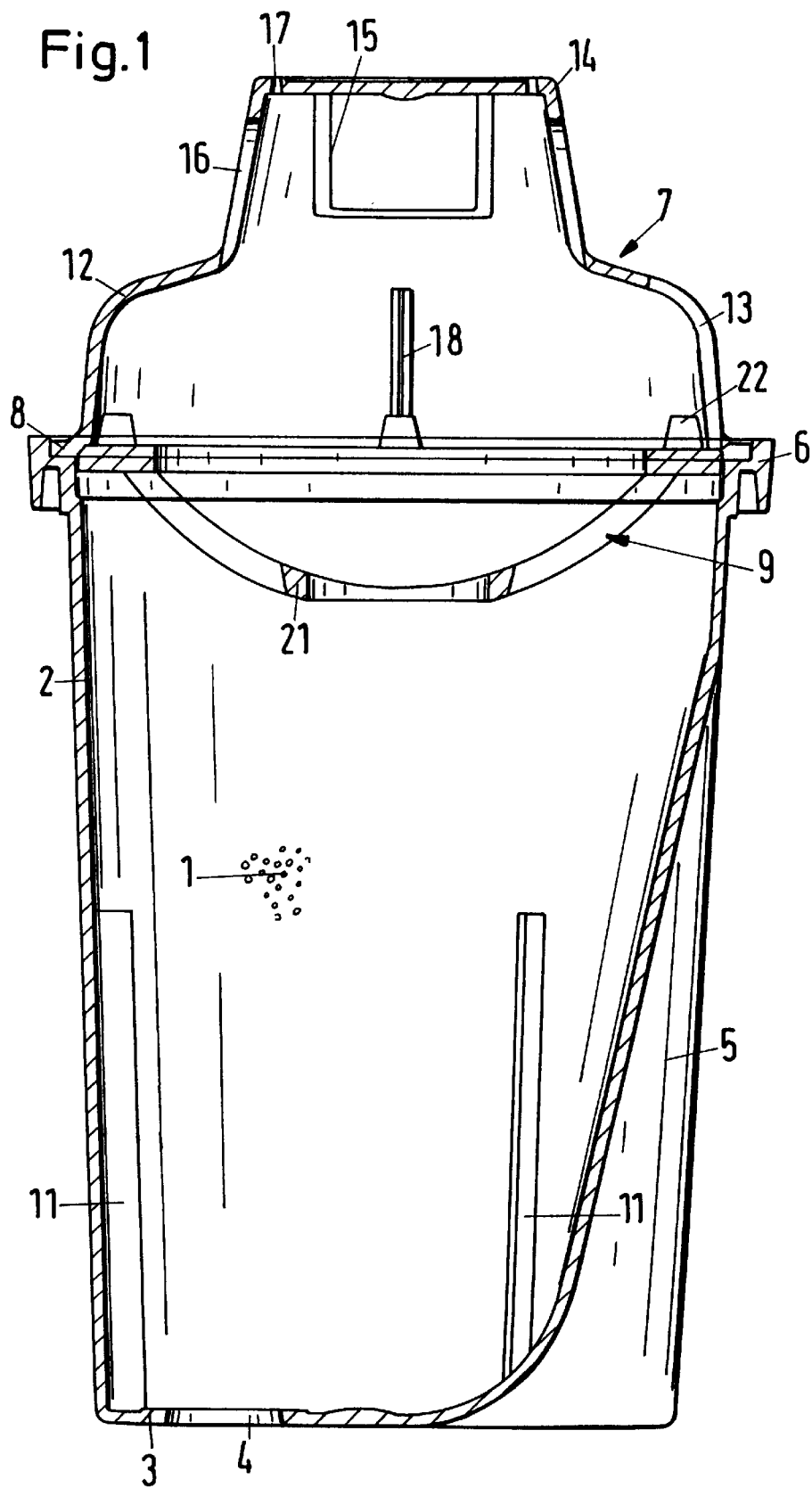

United States Patent
Bairischer

[11] Patent Number: 5,980,743
[45] Date of Patent: Nov. 9, 1999

[54] FILTER MEANS WITH FABRIC INSERT

[75] Inventor: Uwe Bairischer, Londonderry, N.H.

[73] Assignee: Brita Wasser-Filter-Systeme GmbH, Taunusstein, Germany

[21] Appl. No.: 08/906,759

[22] Filed: Aug. 5, 1997

[30] Foreign Application Priority Data

Aug. 6, 1996 [DE] Germany .......................... 196 31 687

[51] Int. Cl.⁶ ................................................. B01D 27/02
[52] U.S. Cl. ........................ 210/266; 210/282; 210/291
[58] Field of Search ..................... 210/266, 282, 210/289, 291, 470

[56] References Cited

U.S. PATENT DOCUMENTS

| 434,570 | 8/1890 | Sargent | 210/282 |
|---|---|---|---|
| 4,178,249 | 12/1979 | Councill | 210/282 |
| 4,378,293 | 3/1983 | Duke | 210/282 |
| 4,800,018 | 1/1989 | Moser | 210/266 |
| 4,969,996 | 11/1990 | Hankammer | 210/282 |
| 5,002,665 | 3/1991 | Brueggemann | 210/266 |
| 5,049,272 | 9/1991 | Nieweg | 210/266 |
| 5,071,551 | 12/1991 | Muramatsu et al. | 210/266 |
| 5,505,120 | 4/1996 | Albertson | 99/286 |

FOREIGN PATENT DOCUMENTS

| B-35226/93 | 3/1993 | Australia . |
|---|---|---|
| 0 219 004 | 6/1991 | European Pat. Off. . |
| 0 681 994 | 4/1995 | European Pat. Off. . |
| 29 17 134 | 10/1980 | Germany . |
| WO 92/19552 | 11/1992 | WIPO . |
| WO 96/21621 | 7/1996 | WIPO . |

*Primary Examiner*—Ivars Cintins
*Attorney, Agent, or Firm*—Michael L. Dunn

[57] ABSTRACT

A filter means for liquids with a filter cup (2) filled with filter material (1), the base (3) of which has at least one sieve-like outlet aperture (4) for the liquid, and with a lid (7) which is provided with at least one sieve-like inlet aperture (13) for the liquid, and is joined in a liquid-tight manner to the filter cup (2). In a preferred embodiment a fabric insert (9) is provided between the filter cup (2) and the lid (7). The fabric insert (9) is provided with at least one fabric piece (19) projecting into the filter cup (2) which fabric insert has a pore spacing sufficiently small to prevent passage of particles larger than 200 μm.

33 Claims, 2 Drawing Sheets

FILTER MEANS WITH FABRIC INSERT

The invention relates to a filter means for liquids with a filter cup filled with filter material, the base of which has at least one sieve-like outlet aperture for the liquid, and with a lid which is provided with at least one sieve-like inlet aperture for the liquid and is joined in a liquid-tight manner to the filter cup.

Numerous filter means of the type described hereinabove are known, for example for filtering water, wherein ion exchangers and/or activated charcoal are used as filter material. The known filter means has the form of a cartridge, the central longitudinal axis of which is preferably vertically arranged such that the lid is at the top and the base of the filter cup is located at the bottom, and the liquid, preferably the water to be filtered, flows into the lid at the top and leaves the filter cup below at the base. The known filter means is inserted in a funnel provided for it in a water purification device, which is placed on a receiving or collecting container for filtered liquid, and preferably is closed at the top with a removable lid. Into the funnel at the top, the user places, for example, tap water, which can be used for preparing tea or the like after passing through the filter means into the collecting container.

Filter cups and lids are known which have narrow slits forming the inlet and outlet apertures, as these are easy to manufacture using injection moulding techniques. Injection mouldable plastics is preferably used for such filter means.

It is desirable for as effective filtering as possible to provide the liquid entering the filter means with as large a surface of filter material as possible, and to force the liquid to undergo as intensive and comprehensive an adsorption procedure as possible. It is known that when granulates are used as filter material, the smaller the size of the individual filter particles, the greater the active surface. It may happen that particles of approximately 200 µm and smaller are present in the filter material. The active surface available to the liquid to be filtered passing through is thus satisfactorily large. With this advantage also comes the disadvantage, however, that some of these smallest granulate particles pass through the inlet aperture in the lid and the outlet opening in the base. The particles, for example black activated charcoal particles, some floating on the surface of the liquid, bother the user and are undesirable.

The manufacturer of such filter means has naturally attempted to reduce the size of the inlet and outlet apertures. With the slit shape for these apertures, which is easily achieved by injection moulding, there has been no success, in a reproducible and controlled manner, in making the width of the slits less than 200 µm with precision. In particular, activated charcoal particles can be plate-shaped, their minimum dimension reaching 250 µm or less, so it is precisely these particles, which are easily optically visible to the end-user, which can pass through the inlet and outlet slits already representing the lower limit for injection moulding technology.

Planar sieve fabrics in the form of fibrous webs are already placed now on the inner surface of the base of a filter cup and in this way prevent the passing out of smaller particles. Disadvantageously, however, germs collect on such fibrous webs and sieve fabrics made, for example, from paper pulp.

There are also plastics injection moulded sieve fabrics with a smaller pore size of, for example, 200 µm, which have been experimentally been arranged on the top and bottom of the filter cup to try to hold back the filter material. With this, there have up until now been difficulties, to an inexplicable degree, with the through-flow of the liquid with this type of sieve.

The object of the invention is to provide improvements and measures to the extent that even small particles of granulate of, for example, $\leq 200$ µm wide cannot pass through the apertures in the lid, while maintaining perfect functioning of the filter means described in the introduction.

For reasons of filling technology and operational technology, the known filter cup is filled with filter material to only approximately 85% to 95% of its total internal volume, and subsequently the lid is fitted and fixed in a liquid-tight manner onto the top edge of the filter cup.

When the teaching of the present invention is considered, however, in accordance with which the object described above is solved, in that a fabric insert is arranged between the filter cup and the lid, which has at least one fabric piece projecting into the filter cup, the retaining ability is significantly improved and a good through-flow is ensured.

A plane can be imagined, lying across the top edge of the cup, in particular the filter cup considered here, along which the lid is sealed to the filter cup in a liquid-tight manner. If a planar fabric insert is to be arranged between the filter cup and the lid, approximately in the area of this imaginary plane, there would then be flow problems with the liquid to be filtered. It is evident that above the lid immersed in the liquid to be filtered there is not a very high column of water so the pressure of the liquid caused by gravity is not very great. Additionally, it is known that a liquid has surface tension, which particularly in the case of small sieve pores has a negative effect to the extent that the slightest back pressure of air under the lid is sufficient to block the through-flow of the liquid. The use of a planar fabric insert could not alleviate such a defect.

In accordance with the invention, a fabric insert is now proposed which has at least one fabric piece, that is to say an area of its sieve fabric, which projects from the plane described into the filter cup, that is to say in the direction of the filter material. When the filter cup is filled with filter material almost "up to the top", that is to say to up to 85% or to 95%, this projecting fabric piece of the new fabric insert according to the invention is in contact with the filter material, and in this way, at this point interrupts the surface tension, with the result that the liquid begins to flow here, any air cushion under the lid is squeezed out and thereby any back pressure counter to the pressure of the column of liquid significantly reduces and finally clears. The liquid to be filtered can flow through the filter material without any problem and the small particles of the filter material are at the same time held back extremely well.

It is particularly advantageous according to the invention when the projecting fabric piece is partially dome-shaped. It is known to manufacture fabric pieces with a structure approximately like that of a gauze, except that in the case of the invention the fabric is advantageously made from plastics. Clearly, even when the plastics is non-woven, the word "fabric" can be used for this net-like sieve construction. Thin plastics threads cross at right angles or at an angle and in this way make pores of a size which could not be made smaller in the case of the slits using injection moulding techniques.

As with a gauze, the fabric piece made from plastics can also be made with different surface shapes. Dome-shaped is understood to be any curvature of the surface, so that coffee filter shaped fabric pieces, truncated cone-shaped fabric pieces or the like can be envisaged.

It is particularly preferred when, according to the invention, the fabric piece has the shape of a segment of a sphere and is fixed to a retaining ring. The segment of a sphere is produced in a known manner by the intersection of a sphere along one plane. This plane intersects the sphere along a small circle, producing the sphere cap, which can also be described as the sphere top or calotte. The retaining ring then lies along the small circle of this top or cap-like fabric piece. The retaining ring lies in a plane from which the sphere cap shaped fabric piece projects towards the filter material.

In particular, from a manufacturing point of view, it is advantageous when according to a further configuration of the invention, the fabric piece is fixed onto ribs. The ribs are preferably made from the same plastics as the other parts (cup, sieve lid and so forth) or a compatible material so that the sieve fabric can be injected between the ribs. The ribs can follow the domed or otherwise configured shape of the fabric part projecting into the filter cup and stabilise this shape. This is particularly advantageous with filter cups filled to the maximum extent with filter material, in which after filling a kind of cone of material with a raised area stands up in the centre such that the sphere cap shaped fabric piece, when placed on the free top edge of the filter cup, experiences a certain pressure force which could deform a very fine fabric piece. The shape retaining ribs resist this small pressure force and keep the projecting fabric piece very precisely in shape.

In a further advantageous configuration of the invention, the fabric part projecting furthest into the filter cup is surrounded by an annular rib. The contact between the projecting fabric piece on the one hand and the filter material filled in on the other hand is often best effected when it is not a rib, but instead the fabric piece itself which comes into contact with the filter material, as the liquid is in contact with the fabric piece itself and its surface tension will be interrupted. In automatic filling installations for filter cups, a kind of cone of material forms from time to time, the part of which that stands up furthest is located approximately in the centre. If, in the example presently being considered, a sphere cap shaped fabric piece is used, the point projecting down furthest, like the pole of this sphere cap, is the first to come into contact with the filter material. The annular rib described here ensures that the fabric piece projecting furthest is the first to come into contact with the filter material and not, for example, a rib. In this way reliable interruption of the surface tension is provided so that blockage of the flowing liquid during operation of the filter means according to the invention no longer occurs.

It is advantageous when, according to the invention, the pore size of the fabric is in the range of 50 μm to 300 μm, and preferably of 80 μm to 200 μm. The filter means according to the invention can be operated without any through flow problems, when the pore sizes lie within the range described, and then very effective filter materials can also be used with large active surfaces (small particles), without the risk of small particles trickling out or floating through the apertures.

It can be advantageous from a manufacturing point of view to join the lid to the fabric insert in a non-removable manner. The injection moulding manufacturer can, for example, mould the lid, inject the fabric insert, and join these two parts together, for example by welding. This intermediate product can then be delivered to the filling plant where is available in magazines and is taken hold of by an automatic closing machine, in order to then be placed on the filled filter cup and joined thereto. Neither a machine, nor the manufacturer's staff have then to bother with individual fabric inserts and transport and arrange them with particular care. The lid must nevertheless be correctly positioned to close the filter insert, and when the fabric insert is joined to it in a non-removable manner, no special assembly step is additionally necessary.

The use of a hydrophilised plastics fabric in a filter means of the type described hereinabove is also advantageous. In order to improve, that is to say to shorten, the through flow time of the liquid to be filtered, it is advantageous to treat the sieve fabric made from plastics with substances by means of which the fabric becomes hydrophillic. These substances can be liquids which affect the surface of the plastics.

In a similar manner, in accordance with the invention a bacteriostatically treated plastics fabric can be used in the filter means described hereinabove. There are different methods for this, among which are the effects of steam, irradiation and the like.

Further advantages, features and possibilities for application of the present invention will be evident from the following description of a preferred embodiment with reference to the attached drawings. In these is shown, in FIG. 1 a cross-section view through the filter means according to the invention, FIG. 2 a plan view of the fabric insert from the side of the filter cup, and FIG. 3 a cross-section view through the lid with the fabric insert fitted onto it.

Figure 2:
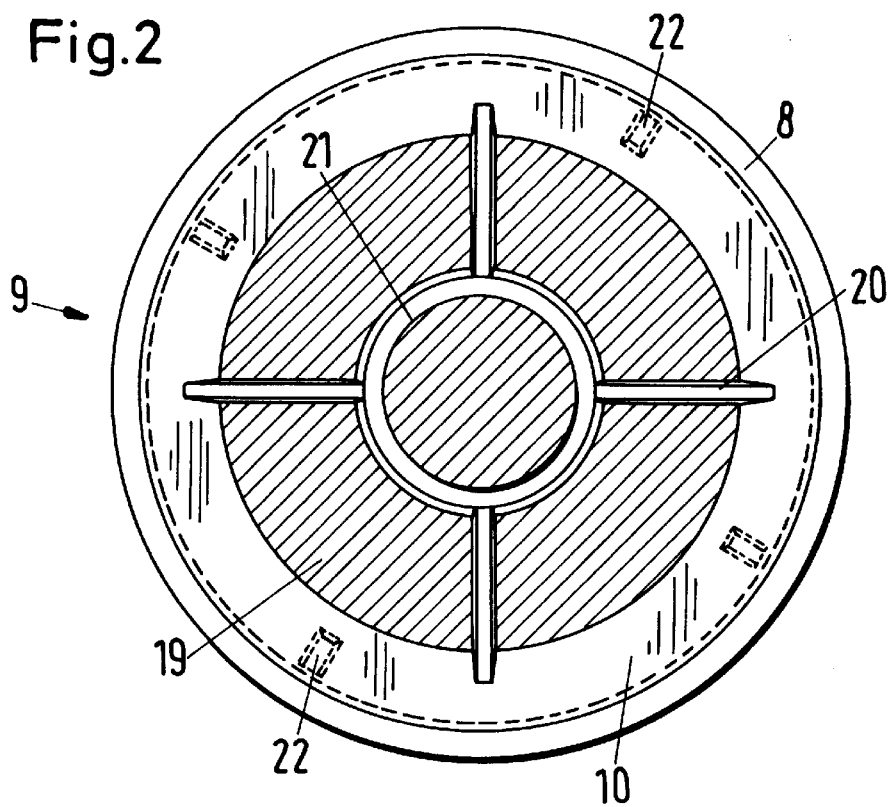

The filter means according to a preferred embodiment, shown completely in cross-section in FIG. 1, is composed of a lower part being a filter cup 2 with granular filter material 1, the base 3 of which has outlet apertures 4 with sieve means which are not shown and at one point is drawn up inwards at an angle, forming a ventilation notch 5. The side walls of the filter cup 2 terminate at the top in a sealing flange 6 which encloses an imaginary horizontal plane; the filter means is further composed of the lid, generally labelled 7, the outer, lower flange 8 of which terminates in the same imaginary horizontal plane and is inserted in the sealing flange fitting such that a liquid-tight join, for example a weld, is easily possible. In addition to the filter cup 2 and the lid 7 placed on it, in the embodiment shown here, the filter means has as its third part a fabric insert 9 which has a retaining ring 10 which also surrounds the imaginary horizontal plane. In this way the retaining ring 10 of the fabric insert 9 fits the lid 7 and the filter cup 2 in such a way that in the area of the common joining plane the three parts can be joined to one another in a liquid tight manner, for example by welding.

In addition, stacking ribs 11 can be seen in the filter cup, which extend from the base 3 upwards over approximately half the height of the filter cup 2 and are regularly distributed, angled towards the inside, on the side walls, for example in threes. After stacking one inside another, the finished filter cups 2 are set down on these stacking ribs 11 for storage. Before assembly of the filter means, the empty filter cups 2 can therefore be stored in rod-like stacks in a magazine.

The lid 7 is composed of a lower outer part 12 adjacent to the external flange 8, in the surface of which inlet apertures 13 for the liquid to be filtered are arranged in a ring. The respective vertical section through the lid 7 according to FIGS. 1 and 3 is set out such that on the right-hand side it runs straight through an inlet aperture 13.

This outer part 12 of the lid 7 narrows towards the top and terminates in a gripping part 14 with an indentation 15 for gripping and with ventilation slits 16 as well as some ventilation holes 17 arranged above them, through which air rising up from below during operation can disperse outside the filter means. Finally, on the inner surface of the lid 7 retaining ribs 18 can be seen, by means of which a contact surface with the fabric insert 9 is produced in the lid 7.

Figure 3:
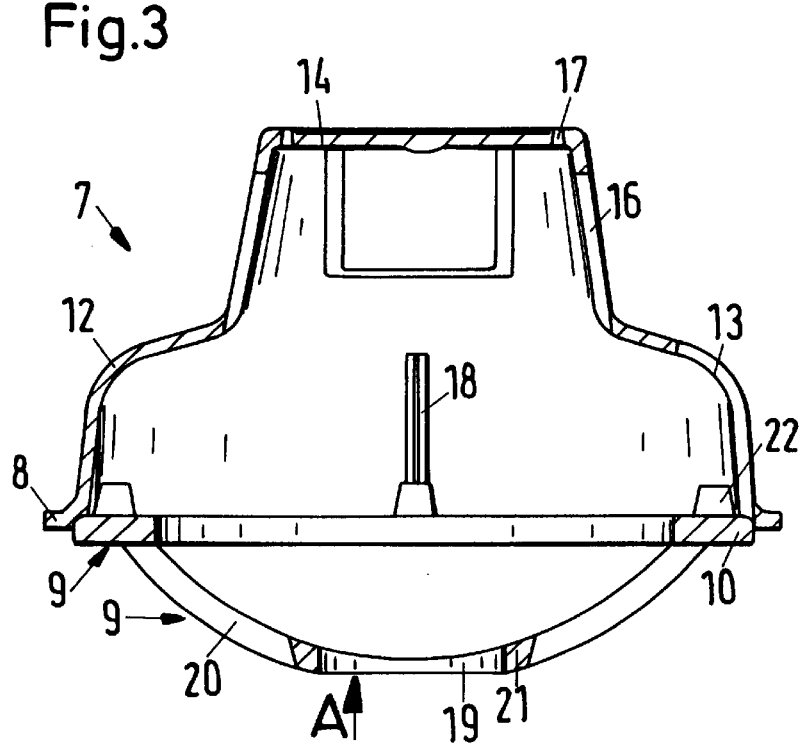

The fabric insert 9, mainly visible in the centre, viewed from below in the direction of the arrow A in FIG. 3, is composed of a sphere cap shaped fabric piece 19 which is indicated by inclined hatching, and should be thought of as having a gauze-like structure. The whole hatched surface of the sieve fabric is represented by the domed fabric piece 19 projecting in the direction of the filter material 1, which is injection moulded into the planar retaining ring 10. Ribs 20 with the centrally arranged annular rib 21 are also injected onto the fabric piece 19 and keep it in a stable shape as a sphere cap.

On the side facing away from the dome-shape facing downwards towards the filter cup 2, that is to say the side facing upwards in FIGS. 1 and 3, which also show the operating shape, four positioning knobs 22 are fitted on the retaining ring 10 evenly distributed about the periphery, which project upwards such that they coincide with the contact surface of the four retaining ribs 18 in the lid 7, when the retaining ring 10 is located in the correct position. This is shown in the Figures.

After completion of the filter cup 2, the lid 7 and the fabric insert 9, the fabric insert can be fitted in the position shown in FIG. 3, in which the positioning knobs 2 are brought into contact with the retaining ribs 18 and the retaining ring 10 is located in the peripheral flange 8 of the lid 7. In this arrangement the fabric insert 9 is welded in a liquid-tight manner to the lid 7.

The filter cup 2 is filled with filter material 1, whereafter the lid 7 is brought into the position shown in FIG. 1 and the flange 8 is welded liquid-tight onto the sealing flange 6.

The filter means made in this way according to FIG. 1 can then be placed in a filter device and used by the end user. The liquid poured in at the top, preferably water to be filtered, enters through the liquid inlet apertures 13, also described as sieve slits, in the lid 7, flows through the fabric insert 9, the filter material 1, and leaves the filter cup 2 through the outlet aperture 4 which keeps the filter material 1 back by means of a sieve.

I claim:

1. A filter means for liquids with a filter cup (2) filled with filter material (1), the base (3) of which has at least one sieve-like outlet aperture (4) for the liquid, and with a lid (7) which is provided with at least one sieve-like inlet aperture (13) for the liquid, and is joined in a liquid-tight manner to the filter cup (2), wherein a fabric insert (9) is arranged between the filter cup (2) and the lid (7), which insert is provided with at least one woven fabric piece (19) projecting into the filter cup (2), whereby the liquid flows from the top, driven by gravity, through at least one sieve-like inlet aperture (13) in the lid (7), through the fabric insert (9), through the filter material (1) and then through the at least one sieve-like outlet aperture (4).

2. A filter means according to claim 1, wherein the projecting fabric piece (19) is at least partially dome-shaped.

3. A filter means according to claim 2, wherein the fabric piece (19) has the shape of a sphere cap and is fixed to a retaining ring (10).

4. A filter means according to claim 2, wherein the fabric piece (19) is fitted onto ribs (20).

5. A filter means according to claim 1, wherein the fabric piece (19) has the shape of a sphere cap and is fixed to a retaining ring (10).

6. A filter means according to claim 5, wherein the fabric piece (19) is fitted onto ribs (20).

7. A filter means according to claim 5, wherein a portion of the fabric piece (19) projecting furthest into the filter cup (2) is surrounded by an annular rib (21).

8. A filter means according to claim 5, wherein the pore size of the fabric (19) is in the range of from 50 μm to 300 μm.

9. A filter means according to claim 5 wherein the lid (7) is joined in a non-removable manner to the fabric insert (9).

10. A filter means according to claim 5 wherein fabric piece (19) comprises a hydrophilised plastics fabric.

11. A filter means according to claim 5 wherein fabric piece (19) comprises a bacteriostatically treated plastics fabric.

12. A filter means according to claim 1, wherein the fabric piece (19) is fitted onto ribs (20).

13. A filter means according to claim 12, wherein a portion of the fabric piece (19) projecting furthest into the filter cup (2) is surrounded by an annular rib (21).

14. A filter means according to claim 12, wherein the pore size of the fabric (19) is in the range of from 50 μm to 300 μm.

15. A filter means according to claim 12 wherein the lid (7) is joined in a non-removable manner to the fabric insert (9).

16. A filter means according to claim 12, wherein fabric piece (19) comprises a hydrophilised plastics fabric.

17. A filter means according to claim 12 wherein fabric piece (19) comprises a bacteriostatically treated plastics fabric.

18. A filter means according to claim 1, wherein a portion of the fabric piece (19) projecting furthest into the filter cup (2) is surrounded by an annular rib (21).

19. A filter means according to claim 18, wherein the pore size of the fabric (19) is in the range of from 50 μm to 300 μm.

20. A filter means according to claim 18 wherein the lid (7) is joined in a non-removable manner to the fabric insert (9).

21. A filter means according to claim 18 wherein fabric piece (19) comprises a hydrophilised plastics fabric.

22. A filter means according to claim 18 wherein fabric piece (19) comprises a bacteriostatically treated plastics fabric.

23. A filter means according to claim 1, wherein the pore size of the fabric (19) is in the range of from 50 μm to 300 μm.

24. A filter means according to claim 23 wherein the lid (7) is joined in a non-removable manner to the fabric insert (9).

25. A filter means according to claim 23 wherein fabric piece (19) comprises a hydrophilised plastics fabric.

26. A filter means according to claim 23 wherein fabric piece (19) comprises a bacteriostatically treated plastics fabric.

27. A filter means according to claim 1 wherein the lid (7) is joined in a non-removable manner to the fabric insert (9).

28. A filter means according to claim 27 wherein fabric piece (19) comprises a hydrophilised plastics fabric.

29. A filter means according to claim 27 wherein fabric piece (19) comprises a bacteriostatically treated plastics fabric.

30. A filter means according to claim 1 wherein fabric piece (19) comprises a hydrophilised plastics fabric.

31. A filter means according to claim 30 wherein fabric piece (19) comprises a bacteriostatically treated plastics fabric.

32. A filter means according to claim 1 wherein fabric piece (19) comprises a bacteriostatically treated plastics fabric.

33. A filter means according to claim 1, wherein the lid (7) is welded to the fabric insert (9) which is welded to the filter cup (2), which is welded to the lid (7), these three pieces (2, 7, 9) being joined to one another in a liquid-tight manner.

* * * * *